United States Patent
Collette

[19]
[11] Patent Number: 5,919,365
[45] Date of Patent: Jul. 6, 1999

[54] FILTER DEVICE FOR DRINKING CONTAINER

[76] Inventor: Daniel Collette, 502-3980 Carrigan Court, Burnaby, British Columbia, Canada, V3N 4S6

[21] Appl. No.: 08/897,654

[22] Filed: Jul. 21, 1997

[51] Int. Cl.$^6$ ........................................... B01D 29/00
[52] U.S. Cl. .................... 210/419; 210/429; 210/432; 210/446; 210/473; 220/666; 220/703; 220/714; 220/907; 222/167; 222/189.06; 222/189.09
[58] Field of Search ...................... 220/666, 703, 220/714, 907; 222/107, 189.06, 189.09; 210/419, 429, 432, 464, 473, 446

[56] References Cited

U.S. PATENT DOCUMENTS

| | | | |
|---|---|---|---|
| 4,093,124 | 6/1978 | Morane et al. ........................ | 222/189 |
| 4,533,068 | 8/1985 | Meierhoefer ........................... | 222/189 |
| 4,695,379 | 9/1987 | Nohren, Jr. et al. . | |
| 5,122,272 | 6/1992 | Iana . | |
| 5,211,973 | 5/1993 | Nohren, Jr. . | |
| 5,238,153 | 8/1993 | Castillo et al. ........................ | 222/189 |
| 5,376,272 | 12/1994 | Spearman . | |
| 5,431,813 | 7/1995 | Daniels . | |
| 5,433,848 | 7/1995 | Platter et al. . | |
| 5,545,315 | 8/1996 | Lonnerman ........................... | 210/120 |
| 5,605,257 | 2/1997 | Beard .................................... | 222/514 |
| 5,609,759 | 3/1997 | Nohren, Jr. et al. . | |
| 5,635,079 | 6/1997 | Becking, II ............................ | 210/436 |

*Primary Examiner*—David A. Reifsnyder
*Attorney, Agent, or Firm*—Norman M. Cameron

[57] ABSTRACT

A drinking container includes a flexible, hollow body having a neck. There is closure member removably connected to the neck. There is a spout on the closure member. A filter device is operatively connected to the spout within the body. The filter device includes a filter, a passageway bypassing the filter and a movable valve member in the passageway which opens the passageway when the container is in upright position when the spout is on top. The valve member blocks the passageway when the container is inverted from the upright position or pressurized.

12 Claims, 4 Drawing Sheets

FILTER DEVICE FOR DRINKING CONTAINER

BACKGROUND OF THE INVENTION

This invention relates to drinking containers, particularly to flexible drinking containers of the type typically used for cycling and other sports activities.

Flexible drinking containers, commonly known as water bottles, are used for many sports and outdoor activities such as cycling, running and hiking. These containers conventionally have a body made of a flexible material such as polyethylene. There is a neck on the body, usually having male threads. A closure member, or cap, has complementary female threads and is removably fitted on the body. There is a spout on the closure member provided with a slidable stopper.

When the stopper is pushed towards the closure member, fluid is prevented from leaving or entering the container. When a person wants to drink liquid held by the container, the stopper is pulled outwardly and the container is usually tipped with the nipple pointing downwardly into or towards the mouth. The user squeezes the container and forces the liquid out of the spout into his or her mouth. After drinking a quantity of liquid, the container is returned to the upright position and released. The container expands outwardly, drawing air into the container through the spout.

Often the container is filled with water or other liquds which may be obtained from dubious sources. In addition, many people do not wish to drink untreated or unfiltered tap water. As a result, there is a need for filtering or treating water in such containers before it is consumed. It might be possible to fit a filter onto the spout of such a container, for example. However, while such a filter would filter liquid squeezed from the container, it would impede air from returning into the container after it is uprighted. Air might eventually pass through the filter, but it would be slowed and would mean that be user could not immediately take another drink after the first one because of the interval required to refill the container with air.

As a result, there is a need for an improved device for filtering or treating liquds dispensed by such sports containers.

It is an object of the invention to provide an improved filtering device adapted for use in conjunction with flexible, sports water containers.

It is also an object of the invention to provide an improved filtering device for sports water containers which filters or treats water squeezed from the container, but does not impede a return flow of air into the container.

It is a further object of the invention to provide an improved filtering device for sports water containers which is economical to produce and rugged and reliable in operation.

It is a still further object of the invention to provide an improved filtering device for sports water containers where the filter is not contaminated by particles in air which enters the container.

SUMMARY OF THE INVENTION

According to the invention there is provided a drinking container, comprising a flexible, hollow body having an interior, a neck and a closure member removably connected to the neck. There is a spout on the closure member. A filter device is operatively connected to the spout within the body. The filter device includes a filter and a valve with a passageway bypassing the filter. There is a movable valve member in the passageway which opens the passageway when the container is in an upright position with the spout on top and blocks the passageway when the container is inverted from the upright position or pressurized.

The filter device may include a hollow housing, the filter and the valve member being within the housing.

The valve member may be reciprocatingly movable within the housing. The passageway includes a first opening between the spout and the housing. There is a space between the housing and the valve member and a second opening between the housing and the interior of the body. The valve member blocks the first opening when the container is inverted or pressurized, whereby fluid leaving the container passes through the filter before entering the spout. The valve member falls away from the first opening when the container is restored to the upright position or depressurized, whereby air entering through the spout passes through the first opening, the passageway and the second opening into the interior of the body, bypassing the filter.

DETAILED DESCRIPTION OF THE PREFERRED EMBODIMENTS

Figure 1:
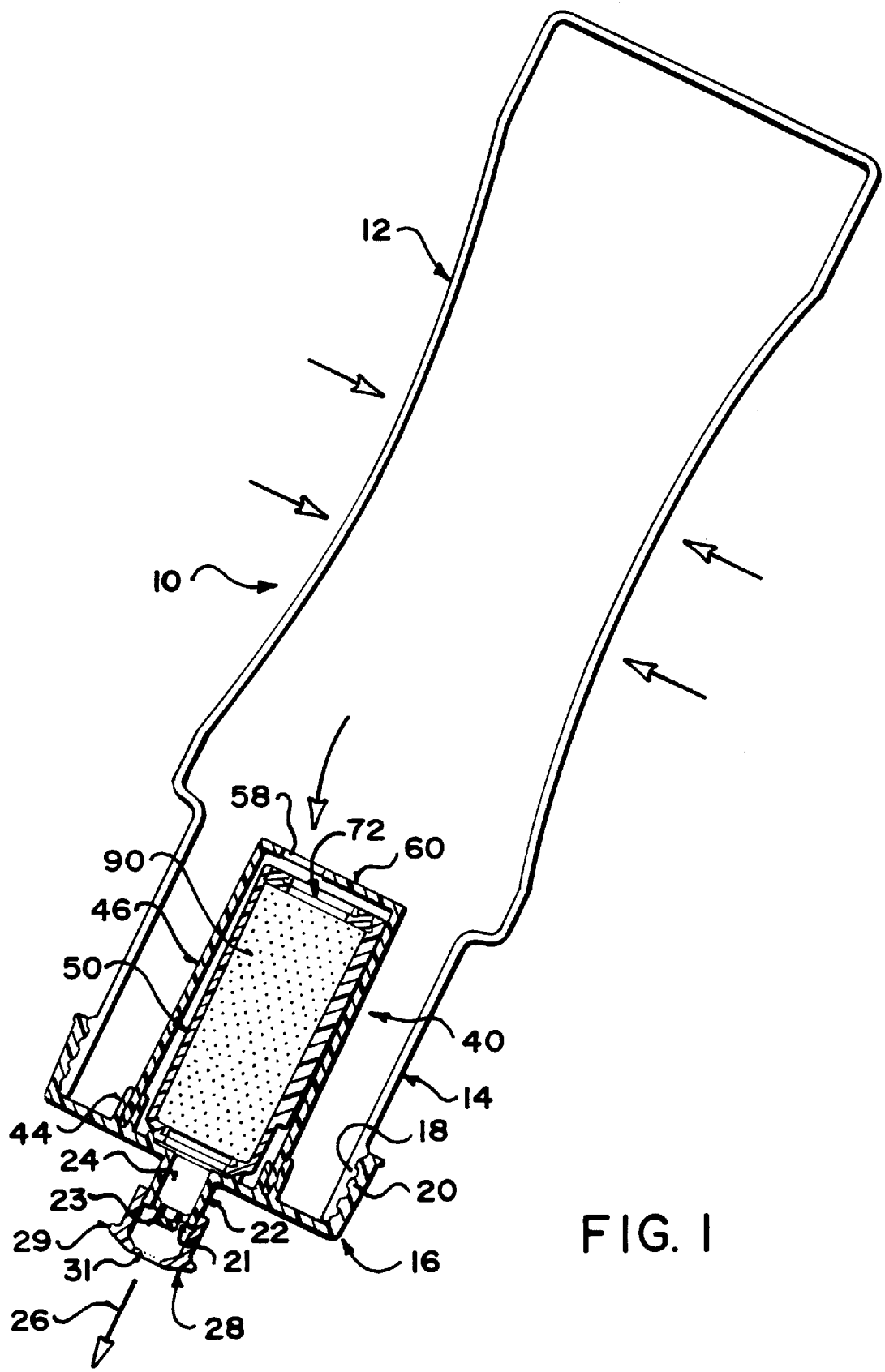
FIG. 1 is a longitudinal section of a drinking container according to an embodiment of the invention, shown inverted to dispense liquid from the container.
Figure 2:
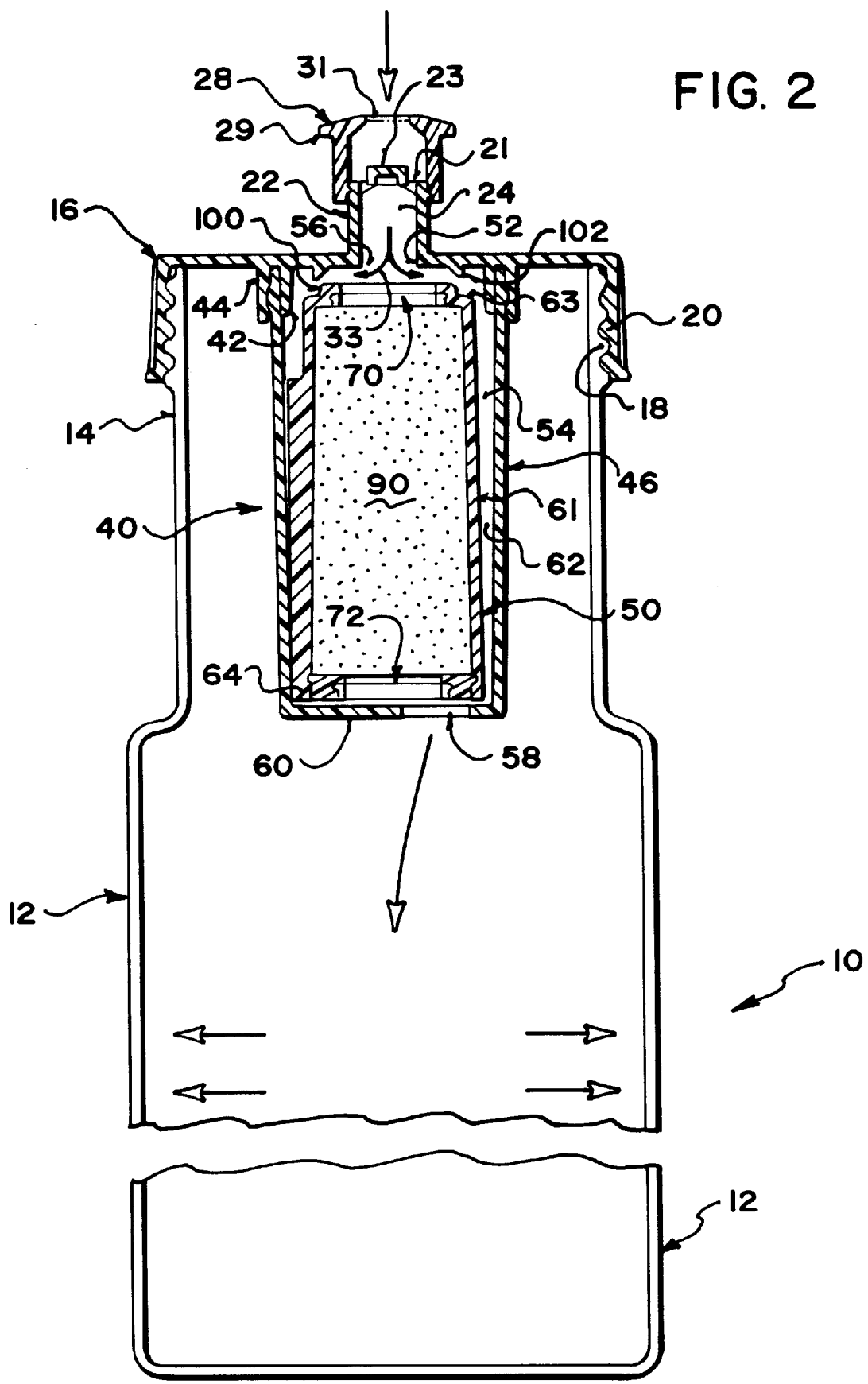
FIG. 2 is a longitudinal section of the container of FIG. 1, shown upright with air entering the container.
Figure 3:
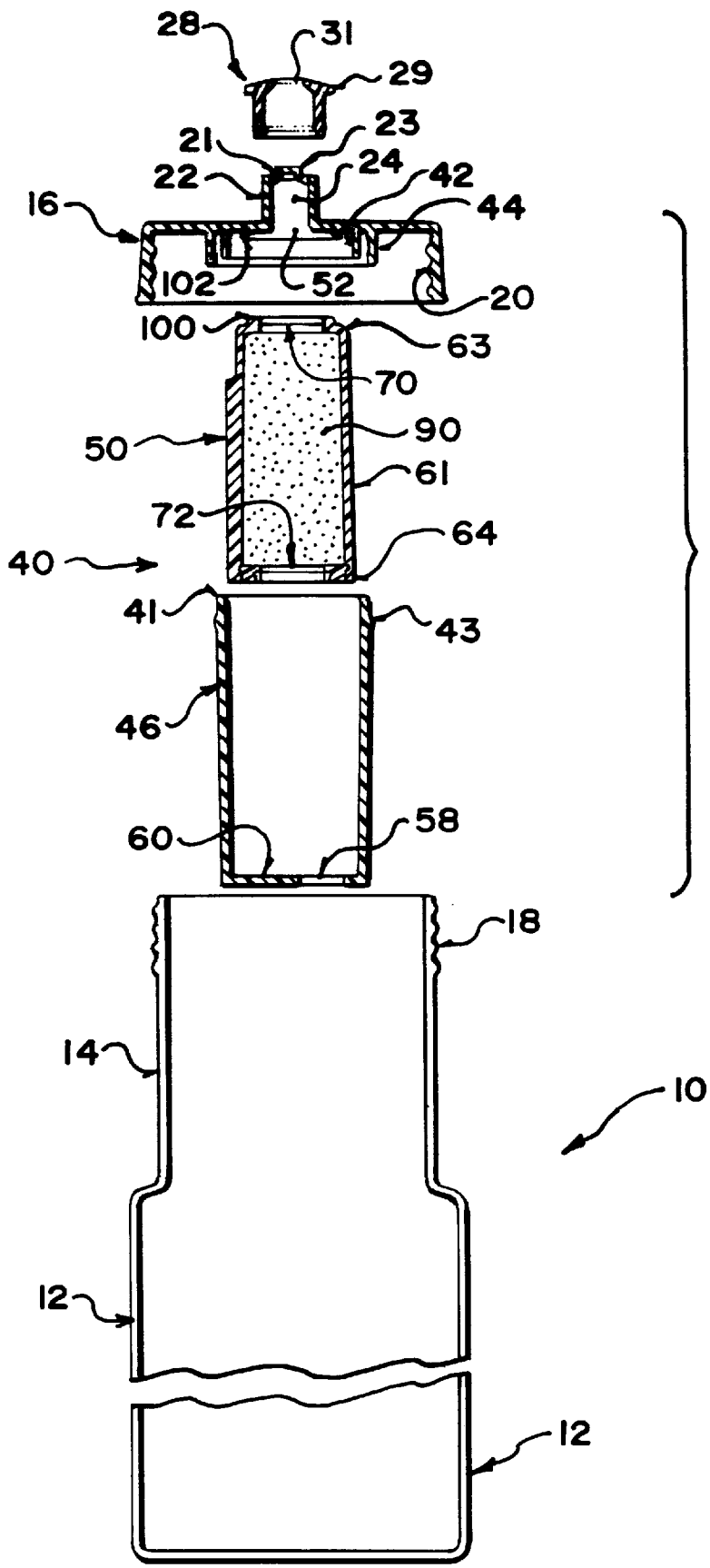
FIG. 3 is an exploded view of the container of FIG. 1 and 2 and the filtering device thereof.

Referring to the drawings, and first to FIG. 1–3, these show a drinking container 10 according to an embodiment of the invention. The drinking container has a body 12 which is a hollow, flexible member, typically of polyethylene or a similar plastic. The body has a neck 14 fitted with a removable closure member or cap 16. In this example the neck 14 is provided with male treads 18 and the closure member 16 has complementary female threads 20. Other means could be used to removably connect the closure member to the body.

There is a spout 22 on the closure member which has a central opening 24 to allow liquds to exit the container as indicated by arrow 26 in FIG. 1. The spout has an annular outer opening 21 with a central plug 23. There is a stopper 28 slidably received on the spout. The stopper has an outer flange 29 and a central opening 31. FIG. 1 and 2 show the stopper pulled away to allow liquid to flow out of the container through annular opening 21 of the spout and opening 31 of the stopper, as shown in FIG. 1, to allow air to enter the container as shown by arrows 33 in FIG. 2. When the stopper is pushed towards the body 12, the stopper seals the annular opening 21 of the spout and the plug 23 seals the opening 31 in the stopper. This arrangement is conventional for water bottles of the general type.

The container has a filter device shown generally at 40. The filter device is connected to the closure member by means of a pair of spaced-apart annular flanges 42 and 44 inside the closure member. The filter device 40 has a hollow housing 46 having an open top 41 equipped with an outer lip 43, shown best in FIG. 3. The lip 43 snaps in place between the flanges 42 and 44 on the closure member to connect the filter device thereto.

There is a movable valve member 50 within the housing 46. When the container is in the upright position, as seen in FIG. 2, the valve member 50 is spaced-apart downwardly from inner end 52 of the spout, allowing air to enter the container as shown by arrows 33. A passageway 54 extends from first opening 56 at the inner end of the spout to a second opening 58 in bottom 60 of the housing. The passageway 54 also includes an annular space 62 between the valve member 50 and the inside of the housing 46. The air can pass through the spout 22 and pass about the valve member through the space 62 to the opening 58 and into the container when the stopper 28 is open and the container is upright.

Figure 4:
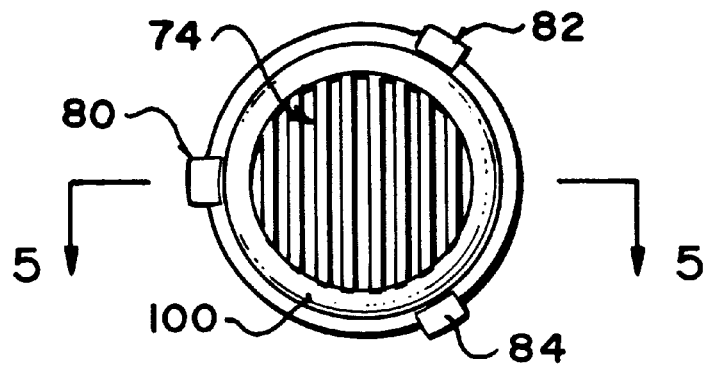
FIG. 4 is a top plan view of the valve member thereof.
Figure 5:
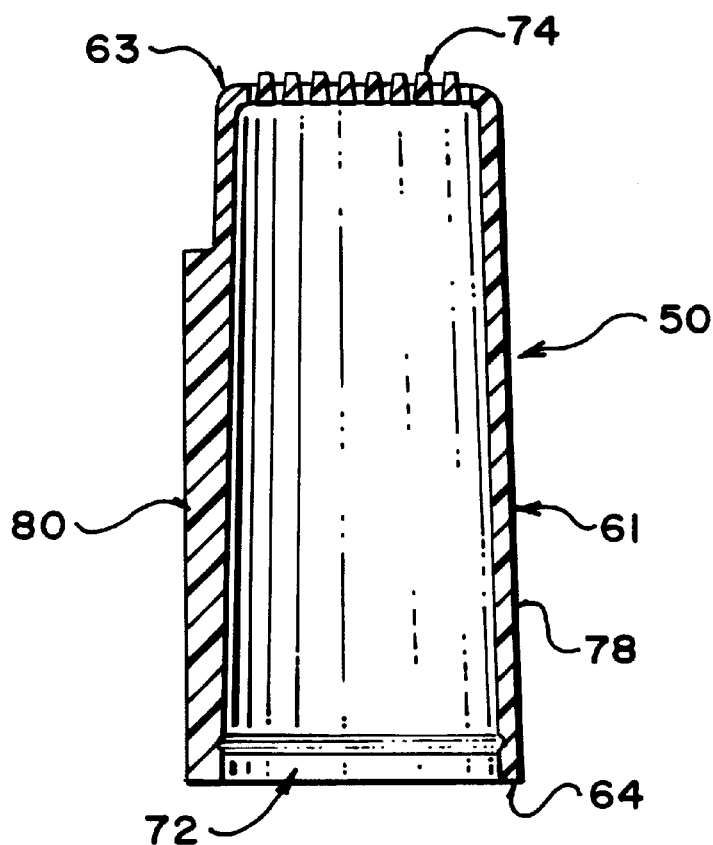
FIG. 5 is a sectional view of the body of the valve member taken along line 5—5 of FIG. 4.
Figure 6:
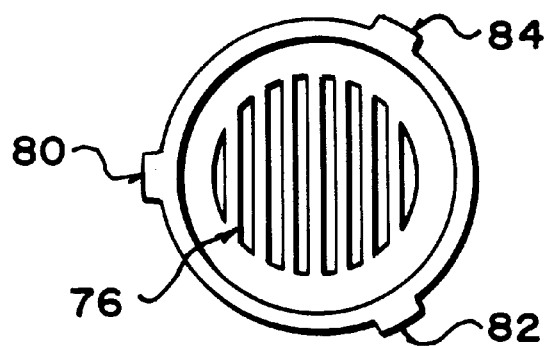
FIG. 6 is a bottom plan view thereof.

The valve member 50 has a hollow body 61 which is cylindrical in shape with a top 63 and a bottom 64. There is a top opening 70 in the top and a bottom opening 72 in the bottom. These openings are provided with circular grates 74 and 76 respectively as seen in FIG. 4 and 6.

The body 61 has a cylindrical outer wall 78 which is provided with three ribs 80, 82, and 84 extending longitudinally therealong to space the wall 78 from the housing 46 and thereby provide the space 62 between the valve member and the housing.

The housing 46 is tapered from its top 41 towards its bottom 60. Thus the ribs 80–84 contact the interior of the housing and maintain the valve member above the bottom 60 of the housing when the container is in the upright position as seen in FIG. 2. This allows air to pass between the bottom of the valve member and the bottom of the housing to reach opening 58 and pass into the interior of the container.

A filter 90, shown in FIG. 1–3, occupies the interior of the valve member. In this example the filter is a combination of activated carbon and ionic cationic exchange resins. This embodiment uses type HR5 Coconut Shell Carbon, sold by Barneby & Sutcliffe Corp. of Columbus Ohio, and Ionac C-249 Cation exchange resin sold by Sybron Chemicals, Inc. of Birmingham, N.J. However other filter mediums or other substances for treating water could be substituted.

There is a disk-shaped protrusion 100 on the top of the valve member and a complementary-shaped recess 102 on the inside of the closure member as seen best in FIG. 2 and 3. When the body of the container is squeezed or when it is inverted from the position of FIG. 2, the pressure of fluid inside the container or gravity moves the valve member towards the closure member such that the protrusion 100 seals the opening 56 by fitting within the recess 102.

Thus, when the user drinks from the container, fluid from the container enters opening 58 and enters the filter through opening 72. The liquid flows through the filter and exits through opening 70 to pass through the spout and exit the container for consumption. When the container is uprighted again or released, as shown in FIG. 2, the valve member returns to the position spaced-apart from the closure member so that air can enter the container via passageway 54, bypassing the filter.

It will be understood from by someone skilled in the art that the above description is an example only of the invention and can be varied without departing from the scope of the invention as set forth in the following claims.

What is claimed is:

1. A drinking container comprising:
   a flexible, hollow body having a neck;
   a closure member removably connected to the neck;
   a spout on the closure member; and
   a filter device connected to the spout within the body, the device including a hollow housing within the body, a filter within the body reciprocatingly movable within the housing, a passageway bypassing the filter and a movable valve member in the passageway which opens the passageway when the container is in an upright position with the spout on top, and blocks the passageway when the container is inverted from said upright position or is pressurized, the filter being within the valve member, the valve member being within the body and being reciprocatingly movable within the housings the passageway including a first opening between the spout and the housing, a space between the housing and the valve member and a second opening between the housing and the interior of the body.

2. A drinking container as claimed in claim 1, wherein the valve member blocks the first opening when the container is inverted or pressurized, whereby fluid leaving the container passes through the filter before entering the spout.

3. A drinking container as claimed in claim 2, wherein the valve member falls away from the first opening when the container is restored to the upright position and depressurized whereby air entering through the neck passes through the first opening, the passageway and the second opening into the interior of the body, bypassing the filter.

4. A drinking container as claimed in claim 3, wherein the housing is cylindrical, the valve member being cylindrical and the passageway including an angular space between the valve member and the housing.

5. A drinking container as claimed in claim 4, wherein the valve member has a cylindrical side wall and 3 ribs extending longitudinally therealong to space the side wall apart from the housing.

6. A drinking container as claimed in claim 5, wherein the housing has a top and a bottom, the first opening being on the top and the second opening being in the bottom.

7. A drinking container as claimed in claim 6, wherein the housing has an interior which tapers from the top towards the bottom, the ribs of the valve member maintaining the valve member above the bottom of the housing when the container is in the upright position.

8. A drinking container as claimed in claim 7, wherein the closure member has a recess adjacent the spout, the valve member having a protrusion which is complementary to the recess in shape and occupies the recess when the container is inverted from the upright position.

9. A drinking container, comprising:
   a flexible, hollow body having an interior and a neck;
   a closure member removably connected to the neck;
   a spout on the closure member; and
   a filter device operatively connected to the spout within the body, the filter device including a filter which is reciprocatingly mounted with respect to the spout, whereby the filter device engages the spout when the container is inverted or pressurized to filter liquid exiting the container, and disengages from the spout when the container is upright and depressurized to allow air to enter the container and bypass the filter.

10. A filter device for drinking containers having a removable closure member with a spout, the device including:
    a housing including a connector engagable with the closure member;

a body reciprocatingly mounted in the housing having a top and a bottom, a first opening at the top and a second opening at the bottom;

a valve member at the top of the body shaped to sealingly engage the container adjacent the spout; and a filter inside the body.

11. A filter device as claimed in claim 10, wherein the valve member has a protrusion on the top of the body.

12. A filter device as claimed in claim 10, wherein the body has an exterior and three longitudinal ribs extending longitudinally along the exterior.

* * * * *